US009093924B2

(12) United States Patent
Gupta et al.

(10) Patent No.: US 9,093,924 B2
(45) Date of Patent: Jul. 28, 2015

(54) METHOD OF CONTROLLING A GRID SIDE CONVERTER OF A WIND TURBINE AND SYSTEM SUITABLE THEREFORE

(75) Inventors: Amit Kumar Gupta, Singapore (SG); Tripathi Anshuman, Singapore (SG); Shu Yu Cao, Singapore (SG)

(73) Assignee: Vestas Wind Systems A/S, Aarhus N. (DK)

( * ) Notice: Subject to any disclaimer, the term of this patent is extended or adjusted under 35 U.S.C. 154(b) by 315 days.

(21) Appl. No.: 13/817,524

(22) PCT Filed: Aug. 16, 2011

(86) PCT No.: PCT/DK2011/050310
§ 371 (c)(1),
(2), (4) Date: Jun. 12, 2013

(87) PCT Pub. No.: WO2012/022353
PCT Pub. Date: Feb. 23, 2012

(65) Prior Publication Data
US 2013/0265809 A1 Oct. 10, 2013

Related U.S. Application Data

(60) Provisional application No. 61/374,646, filed on Aug. 18, 2010.

(30) Foreign Application Priority Data

Aug. 18, 2010 (DK) ................................. 2010 70365

(51) Int. Cl.
*H02M 7/5387* (2007.01)
*H02M 7/539* (2006.01)
(Continued)

(52) U.S. Cl.
CPC ............... *H02M 7/539* (2013.01); *H02J 3/386* (2013.01); *H02M 7/53875* (2013.01); *H02P 9/00* (2013.01); *H02M 7/483* (2013.01); *H02P 2101/15* (2015.01); *Y02E 10/763* (2013.01)

(58) Field of Classification Search
CPC ... Y02E 10/76; Y02E 10/763; H02M 7/5387; H02M 2007/53876

USPC .......................... 290/44; 363/95, 97, 98, 132
See application file for complete search history.

(56) References Cited

U.S. PATENT DOCUMENTS 3,971,972 A * 7/1976 Stich .............................. 318/811
4,400,659 A * 8/1983 Barron et al. .................... 322/32
(Continued)

FOREIGN PATENT DOCUMENTS

CN 101521481 A 9/2009
CN 101697420 A 4/2010
(Continued)

OTHER PUBLICATIONS

Xiongfei Wang et al: "Control of grid interactive AC microgrids", Industrial Electronics (ISIE), 2010 IEEE International Symposium on IEEE, Piscataway, NJ, USA, Jul. 4, 2010, pp. 2211-2216.
(Continued)

*Primary Examiner* — Gary L Laxton
(74) *Attorney, Agent, or Firm* — Patterson & Sheridan, LLP

(57) ABSTRACT

According to an embodiment of the present invention, a method of controlling a grid side converter of a wind turbine is provided, wherein an output of the grid side converter is connected or connectable via a power line to an input of a grid transformer, the method comprising: determining a converter volt-sec occurring at the output of the grid side converter based on a converter voltage occurring at the output of the grid side converter; determining a volt-sec error between the determined converter volt-sec and a converter volt-sec reference, wherein the converter volt-sec reference is determined based on active power reference, reactive power reference, line current and a line voltage occurring at the input of the grid transformer (or at wind turbine terminals); and controlling, based on the determined volt-sec error, the grid side converter such that the volt-sec error is partly or fully compensated. The method is capable of supporting the demanded power quality even during abnormal voltage conditions, and is easy to realize. The method can seamlessly transit from linear to non-linear region of converter operation.

27 Claims, 8 Drawing Sheets

(51) Int. Cl.
*H02J 3/38* (2006.01)
*H02P 9/00* (2006.01)
*H02M 7/483* (2007.01)
*H02P 101/15* (2015.01)

(56) References Cited

U.S. PATENT DOCUMENTS

| | | | |
|---|---|---|---|
| 5,798,631 | A | 8/1998 | Spee et al. |
| 7,660,135 | B2* | 2/2010 | Fang ............................ 363/17 |
| 2005/0135031 | A1 | 6/2005 | Colby et al. |
| 2007/0052244 | A1* | 3/2007 | Hudson ........................ 290/44 |
| 2010/0142237 | A1 | 6/2010 | Yuan et al. |

FOREIGN PATENT DOCUMENTS

| | | |
|---|---|---|
| EP | 2159910 A1 | 3/2010 |
| WO | 2009083446 A2 | 7/2009 |

OTHER PUBLICATIONS

Mariusz Malinowski et al: "Control of Variable-Speed Type Wind Turbines Using Direct Power Control Space Vector Modulated 3-Level PWM Converter", Industrial Technology, 2006. ICIT 2006. IEEE International Conference ON, IEEE, PI, Dec. 1, 2006, pp. 1516-1521.

Jasinski M et al: "Control of AC-DC-AC converter under unbalanced and distorted input conditions", Compatibility and Power Electronics, 2009, CPE '09, IEEE, Piscataway, NJ, USA, May 20, 2009, pp. 139-145.

Jon Are Suul et al: "Impact of Virtual Flux reference frame orientation on voltage source inverters in weak grids", 2010 International Power Electronics Conference: IPEC-Sapporo 2010 - [ECCE ASIA]; Sapporo, Japan, IEEE Piscataway, NJ, USA, Jun. 21, 2010, pp. 368-375.

Hailian Xie et al: "Comparison of Voltage and Flux Modulation Schemes of StatComs Regarding Transformer Saturation During Fault Recovery", IEEE Transactions on Power Systems, IEEE Service Center. Piscataway, NJ, USA, vol. 23, No. 4, Nov. 1, 2008, pp. 1653-1661.

Rothenhagen K et al: "Grid connection of multi-Megawatt clean Wave energy power plant under weak grid condition", Power Electronics and Motion Control Conference, 2008, EPE-PEMC 2008, 13th, 1904-1910.

Serpa L A et al: "Five-level virtual-flux direct power control for the active neutral-point clamped multilevel inverter", Power Electronics Specialists Conference, 2008. PESC 2008. IEEE, IEEE, Piscataway, NJ, USA, Jun. 15, 2008, pp. 1668-1674.

Serpa L A et al: "A Modified Direct Power Control Strategy Allowing the Connection of Three-Phase Inverters to the Grid Through Filters", IEEE Transactions on Industry Applications, IEEE Service Center, Piscataway, NJ, US, vol. 43, No. 5, Sep. 1, 2007, pp. 1388-1400.

Dawei Zhi et al: "Improved Direct Power Control of Grid-Connected DC/AC Converters", IEEE Transactions on Power Electronics, IEEE Service Center, Piscataway, NJ, US, vol. 24, No. 5, May 1, 2009, pp. 1280-1292.

Nazempour A et al: "Simulation of the PWM rectifier connected to a high frequency power sources", Power Electronic&Drive Systems &Technologies Conference (PEDSTC), 2010 1st, IEEE, Piscataway, NJ, USA, Feb. 17, 2010, pp. 169-174.

Serpa L A et al: "A Virtual-Flux Decoupling Hysteresis Current Controller for Mains Connected Inverter Systems", IEEE Transactions on Power Electronics, IEEE Service Center, Piscataway, NJ, US, vol. 22, No. 5, Sep. 1, 2007, pp. 1766-1777.

International Search Report for PCT/DK2011/050310, Apr. 4, 2012.
Danish Search Report for PA 2010 70365, Apr. 7, 2011.

* cited by examiner

METHOD OF CONTROLLING A GRID SIDE CONVERTER OF A WIND TURBINE AND SYSTEM SUITABLE THEREFORE

TECHNICAL FIELD

The present invention relates generally to a method of controlling a grid side converter of a wind turbine and a system suitable therefore. Further, the present invention relates to a wind turbine.

BACKGROUND

In order to electrically connect a wind turbine generator to a power grid, several power connection arrangements may be used. A typical power connection arrangement (e.g. for a full scale converter based turbine) comprises a generator side converter, a DC (direct current) link, a grid side converter and a grid transformer which are placed between the wind turbine generator and the power grid in this order. The generator side converter controls the generator power and transfers it to the grid through the DC-link and the grid side converter. The control of the grid side converter should be carried out such that the quality of the electrical power supplied to the grid is kept within predetermined tolerance ranges even during abnormal grid voltage conditions like symmetric/asymmetric voltage dip and swell conditions. In case of abnormal grid voltage conditions, support of reactive power may be needed to fulfil the grid requirements. That is, the power which is supplied to the grid needs to have, besides an active power component, a reactive power component. During normal working conditions, the reactive power component might be required depending on the grid support requirement. The reactive power support is getting increasingly important due to the grid code requirements that are getting stricter along the increase of wind power penetration.

It is therefore an object to provide a method of controlling a wind turbine which is capable of supporting the demanded power quality even during abnormal voltage conditions. Further, this method should be easy to realize.

SUMMARY

According to an embodiment of the present invention, a method of controlling a grid side converter of a wind turbine is provided, wherein an output of the grid side converter is connected or connectable via a power line to an input of a grid transformer, the method comprising: a) determining a converter volt-sec occurring at the output of the grid side converter based on a converter voltage occurring at the output of the grid side converter; b) determining a volt-sec error between the determined/actual converter volt-sec and a converter volt-sec reference, wherein the converter volt-sec reference is determined based on an active power reference, a reactive power reference, a line current and a line voltage occurring at the input of the grid transformer (or at wind turbine terminals); and c) controlling, based on the determined volt-sec error, the grid side converter such that the volt-sec error is (partially or fully) compensated. The term 'volt-sec' stands for volt-seconds. It is a vector entity and is equivalent to flux in AC machines. According to an embodiment of the present invention, this process may be supported by volt-sec prediction, as will become apparent later on.

According to an embodiment of the present invention, the converter volt-sec reference is determined based on an active power volt-sec reference, a reactive power volt-sec reference, a line current and a line voltage.

According to an embodiment of the present invention, the active power volt-sec reference is determined based on a difference between an active power reference demanded at the input of the grid transformer (or at wind turbine terminals) and an active power occurring at the input of the grid transformer (or at wind turbine terminals).

According to an embodiment of the present invention, the reactive power volt-sec reference is determined based on a difference between a reactive power reference demanded at the input of the grid transformer (or at wind turbine terminals) and a reactive power occurring at the input of the grid transformer (or at wind turbine terminals).

According to an embodiment of the present invention, the active power volt-sec reference and the reactive power volt-sec reference are respectively frozen if the amplitude of the line current occurring at the input of the grid transformer exceeds a predetermined threshold value.

According to an embodiment of the present invention, the active power and the reactive power are determined based on the line current and the line voltage occurring at the input of the grid transformer.

According to an embodiment of the present invention, determining the converter volt-sec reference comprises generating a first volt-sec reference in dependence on the active power volt-sec reference and the reactive power volt-sec reference.

According to an embodiment of the present invention, the first volt-sec reference is generated as a $\alpha\beta$ frame volt-sec vector.

According to an embodiment of the present invention, determining the converter volt-sec reference comprises generating a second volt-sec reference by adding a grid volt-sec to the first volt-sec reference.

According to an embodiment of the present invention, the grid volt-sec is determined based on at least one of the line current and the line voltage occurring at the input of the grid transformer.

According to an embodiment of the present invention, determining the converter volt-sec reference comprises predicting a converter volt-sec which should occur in the next sampling cycle based on the second volt-sec reference, an angular velocity of the line voltage occurring at the input of the grid transformer and a sampling period of the grid side converter, and using the predicted converter volt-sec as converter volt-sec reference.

According to an embodiment of the present invention, controlling of the grid side converter is carried out by supplying, in dependence on the determined volt-sec error, pulse width modulation signals to the grid side converter which adjust the output voltage of the grid side converter accordingly.

According to an embodiment of the present invention, the compensation of the volt-sec error ($\Delta\phi_c$) is carried out using a PWM switching technique in the linear region of grid side converter operation, and using an over-modulation technique in the non-linear region of the grid side converter operation. Therefore unlike in conventional approaches of current controls, this embodiment naturally extends the grid side converter operation to better utilize the DC-link. Moreover, volt-sec error ($\Delta\phi_c$) compensation technique naturally fits very well to space vector modulation.

According to an embodiment of the present invention, a controlling system for controlling a grid side converter of a wind turbine is provided, an output of the grid side converter being connected or connectable via a power line to an input of a grid transformer. The controlling system comprises an inner control loop and an outer control loop. The inner control loop comprises: a converter volt-sec determining unit which determines a converter volt-sec occurring at the output of the grid side converter based on a converter voltage occurring at the output of the grid side converter; a volt-sec error determining unit determining a volt-sec error between the determined converter volt-sec and a converter volt-sec reference; and a controlling unit which controls, based on the determined volt-sec error, the grid side converter such that the volt-sec error is compensated, wherein the outer control loop is configured to determine the converter volt-sec reference based on active power demand and reactive power demand (active and reactive power reference), a line voltage and a line current occurring at the input of the grid transformer (or at wind turbine terminals).

According to an embodiment of the present invention, the outer control loop comprises an active power volt-sec reference determining unit and a reactive power volt-sec reference determining unit which determines an active power volt-sec reference and a reactive power volt-sec reference based on (1) an active power reference and active power occurring at the input of the grid transformer (or at wind turbine terminals) (2) a reactive power reference and reactive power occurring at the input of the grid transformer (or at wind turbine terminals).

According to an embodiment of the present invention, the active power volt-sec reference determining unit determines the active power volt-sec reference based on a difference between an active power reference and an active power occurring at the input of the grid transformer (or at wind turbine terminals).

According to an embodiment of the present invention, the reactive power volt-sec reference determining unit determines the reactive power volt-sec reference based on a difference between a reactive power reference and a reactive power occurring at the input of the grid transformer (or at wind turbine terminals).

According to an embodiment of the present invention, the outer control loop comprises a current limiting unit which causes the active power volt-sec reference and the reactive power volt-sec reference to be respectively frozen if the amplitude of the line current occurring at the input of the grid transformer exceeds a predetermined threshold value.

According to an embodiment of the present invention, the outer control loop comprises an active power determining unit and a reactive power determining unit which determine the active power and reactive power based on the line current and the line voltage occurring at the input of the grid transformer, respectively.

According to an embodiment of the present invention, the outer control loop comprises a $\alpha\beta$ frame volt-sec vector generating unit which generates a first volt-sec reference as a $\alpha\beta$ frame volt-sec vector in dependence on the active power volt-sec reference, the reactive power volt-sec reference and an angle of the line voltage.

According to an embodiment of the present invention, the outer control loop comprises a second volt-sec reference generating unit which generates a second volt-sec reference by adding a grid volt-sec to the first volt-sec reference.

According to an embodiment of the present invention, the outer control loop comprises a grid volt-sec determining unit which determines the grid volt-sec based on at least one of the line current and the line voltage occurring at the input of the grid transformer.

According to an embodiment of the present invention, the outer control loop comprises a converter volt-sec reference predicting unit which predicts a converter volt-sec for the next sampling cycle based on the second volt-sec reference, an angular velocity of the line voltage occurring at the input of the grid transformer and a sampling period of the grid side converter, and outputs the predicted converter volt-sec as converter volt-sec reference.

According to an embodiment of the present invention, the inner control loop comprises a PWM unit which controls, in dependence on the determined volt-sec error, the output voltage of the grid side converter by supplying pulse width modulation signals to the grid side converter.

According to an embodiment of the present invention, a wind turbine is provided comprising a power generator (AC machine) and a grid side converter, wherein the power generator is connected to the grid side converter via a generator side converter and a DC-link connecting the generator side converter with the grid side converter, and wherein the wind turbine comprises a controlling system for controlling the grid side converter of the wind turbine.

According to an embodiment of the present invention, in order to compensate the volt-sec error (i.e. to compensate the volt-sec error between the determined converter volt-sec and a converter volt-sec reference, also referred to as "volt-sec (volt-seconds) compensation"), any PWM technique can be used. Among various PWM techniques, space vector modulation (SVM) is known for its various advantages. The volt-sec compensation approach naturally fits with the SVM technique.

According to an embodiment of the present invention, the outer control loop may be operated at low bandwidth, whereas the inner control loop may be operated at high bandwidth which helps to obtain good dynamic response. The inner control loop may simply comprise or consist of a volt-sec compensation block which can be executed very fast.

According to an embodiment of the present invention, almost all currents, voltages and volt-secs which are used by the embodiments of the present invention are respectively vectors.

According to an embodiment of the present invention, a PLL (phase locked loop) is used with positive and negative sequence separator. It is also referred to as PLL with positive and negative sequence calculator (PNSC).

According to an embodiment of the present invention, an active power p and reactive power q are calculated using the expressions $p=1.5(v_\alpha i_\alpha+v_\beta i_\beta)$ and $q=1.5(v_\alpha i_\beta-v_\beta i_\alpha)$ where $[v_\alpha, v_\beta]$ are actual or positive sequence grid voltages and $[i_\alpha, i_\beta]$ are actual or positive sequence line currents. Here, $\alpha$ and $\beta$ indicate the $\alpha$ and $\beta$ components of the current and voltage signals in the stationary $\alpha\beta$ frame, respectively.

In the scope of the embodiments of the present invention, the term "volt-sec" stands for "volt-seconds". "Volt-sec" means a vector entity, the unit of which being volt*second. In AC power generators, the term "volt-sec" is equivalent to the term "flux".

According to an embodiment of the present invention, depending on regulation and system requirements, controlling the active power p to the active power reference p* is given priority over controlling the reactive power q to the reactive power reference q*, or vice versa. That is, according to an embodiment of the present invention, depending on the situations, the active power reference p* and the reactive power reference q* may take priority one over the other. For example, when grid support is required, q* may take priority over p*, and in conditions where active power control is required to reduce mechanical stress on the turbine drivetrain/structure, p* may take priority over q*. Of course, it is also possible to give the same priority to both controlling the active power and the reactive power. Many other situations are possible.

In the following, further aspects of embodiments of the present invention will be described.

As has become apparent in the preceding description, embodiments of the present invention provide a grid side converter control philosophy to directly control the real and reactive power transacted with the grid. Due to the simplicity of the proposed close loop control, it can be easily implemented on two-level converters as well as on multi-level converters. The proposed close loop control is capable of riding through grid symmetric/asymmetric voltage dip and swell conditions. This ensures a better connectivity of the turbine with the grid under fault conditions. Further, the approach is computationally simple to realize. With respect to conventional controls, the proposed control requires lesser controllers.

According to an embodiment of the present invention, reactive power needed during a low voltage grid fault ride through event is generated by setting a reactive power reference to a desired value and by limiting an active power reference based on grid side converter current limits. In the low voltage condition, a chopper resistor located in a DC-link may also be used such that active power coming from the generator can be dissipated in the chopper resistor. The same can be applied to high voltage condition.

According to an embodiment of the present invention, a PLL algorithm may be used to estimate the grid angle (γ) and the angular speed (ω) of the grid voltage. The PLL algorithm may be implemented using synchronous rotating frame (SRF) technique and may use moving average (MA) technique to eliminate negative sequence and harmonics components from the grid voltage. Thus, the grid angle (γ) and the angular speed (ω) may be calculated based on the positive sequence voltage. However, the grid angle (γ) and the angular speed (ω) may also be calculated based on the negative sequence voltage. There are many other methods of estimating the grid angle (γ) and the angular speed (ω) of the grid voltage which may be used.

According to embodiments of the present invention, the grid side converter controlling method is able to easily handle symmetric/asymmetric grid voltage swell and dip conditions. Further, the hardware/software structure for realizing the grid side converter controlling method is the same for balanced/unbalanced grid voltages.

According to an embodiment of the present invention, SVM technique may be used to control the grid side converter which can be seamlessly integrated into techniques such as bus-clamping, three phase symmetry and half-wave symmetry PWM. These techniques can help to significantly improve converter performance.

According to an embodiment of the present invention, the switching frequency of the grid side converter is kept constant during operation.

According to an embodiment of the present invention, the proposed algorithm can be easily applied to multilevel inverters as grid side converters. With the use of multilevel inverters, the line filter size and weight may be reduced and cost saving can be achieved.

The following advantages may be achieved by using embodiments of the present invention:

a) A tight control of power and voltage can be achieved due to the use of volt-second based approach.

b) The proposed control method performs well in LVRT (low voltage ride through) and HVRT (high voltage ride through) in both symmetric and asymmetric fault conditions. This is one of the main advantages, compared to conventional DPC (direct power control) approaches. Further, the hardware/software structure for realizing the proposed grid side converter control method is the same for balanced/unbalanced grid conditions.

c) A good dynamic response of the grid side control (fast controlling speed) can be achieved due to an inherently fast inner loop.

d) The proposed control method can be easily operated up to six-step operation which can help to achieve faster dynamic response due to better utilization of the DC-link. This is due to the fact that in the normal modulation range up to 90.7% of the installed DC-link capacity can be utilized. However, through operation in overmodulation region till six-step operation 100% of the installed DC-link capacity can be used. The volt-sec error is significantly large in a dynamic grid condition. Thus, a fast dynamic performance of the grid side controller is needed. This fast dynamic performance can be achieved in view of the simplicity of the proposed control method. The proposed algorithm ensures that the volt-sec balance is maintained even in a dynamic condition e.g. grid faults. As far as details of overmodulation and six-step techniques which may be employed by embodiments of the present invention are concerned, the following references should be cited: (1) N. Mohan, T. M. Undeland, and W. P. Robbins, Power electronics: converters, applications, and design. Hoboken, N.J.: John Wiley and Sons, third ed., 2003. (2) J. Holtz, "Pulsewidth modulation-a survey," Industrial Electronics, IEEE Transactions on, vol. 39, pp. 410-420, October 1992. (3) J. Holtz, W. Lotzkat, and A. M. Khambadkone, "On continuous control of pwm inverters in overmodulation range including six-step," IEEE Transaction on Power Electronics, vol. 8, pp. 546-553, 1993.

e) Due to the use of volt-second compensation, the proposed algorithm is inherently suitable to space vector modulation (SVM) which can be easily applied to two-level or multilevel based grid side converters.

f) The switching frequency of the grid side converter can be kept constant, in contrast to some DPC based control algorithms where the switching frequency is not constant. Constant switching frequency leads to simplicity of a grid filter design. This also helps to limit and reduce the switching loss occurring in power converters.

g) The proposed approach is computationally simple.

h) The proposed concept can easily be used together with synchronous SVM technique which helps to eliminate the subharmonics and interharmonics included within the voltage signal output by the grid side converter. These harmonics are difficult to be filtered by a grid side filter and may create a number of problems for grid control and grid connected applications.

i) Since the proposed concept uses volt-sec as basis, it is inherently suitable for the SVM. The implementation of bus-clamping is very easy for SVM. With bus-clamped SVM, the proposed concept can achieve 33% switching loss reduction. In bus clamping one of the phase legs is not switched at all for a given switching period while still forming the given reference vector with discrete switching states. As far as details of SVM based bus clamping techniques which may be employed by embodiments of the present invention are concerned, the following references should be cited: (1) A. Beig, G. Narayanan, and V. Ranganathan, "Space vector based synchronized pwm algorithm for three level voltage source inverters: principles and application to v/f drives," IECON 02 [Industrial Electronics Society, IEEE 2002 28th Annual Conference of the], vol. 2, pp. 1249-1254, November 2002. (2) G. Narayanan and V. T. Ranganathan, "Synchronised bus-clamping pwm strategies based on space vector approach for modulation up to six-step mode," Power Electronic Drives and Energy Systems for Industrial Growth, 1998. Proceedings. 1998 International Conference on, vol. 2, pp. 996-1001, December 1998. (3) G. Narayanan and V. T. Ranganathan, "Synchronised pwm strategies based on space vector approach. i. principles of waveform generation," Electric Power Applications, IEE Proceedings, vol. 146, pp. 267-275, May 1999. (4) G. Narayanan and V. T. Ranganathan, "Two novel synchronized busclamping pwm strategies based on space vector approach for high power drives," Power Electronics, IEEE Transactions on, vol. 17, pp. 84-93, January 2002.

j) Due to absence of cross coupling term, the proposed controller is more robust especially considering grid choke saturation and frequency variations.

According to an embodiment of the present invention, the compensation of the volt-sec error (volt-sec error $\Delta\psi$) is understood as follows: According the faraday's law, the voltage vector equals the change of the volt-sec vector over time, i.e. $v=d\psi/dt$. It can be equivalently written as $\Delta\psi=v\Delta t$, i.e. the volt-sec error $\Delta\psi$ can be compensated by holding the voltage vector v for the small time period $\Delta t$. This explains the principle of volt-sec error based implementation of SVM.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DETAILED DESCRIPTION

Figure 1:
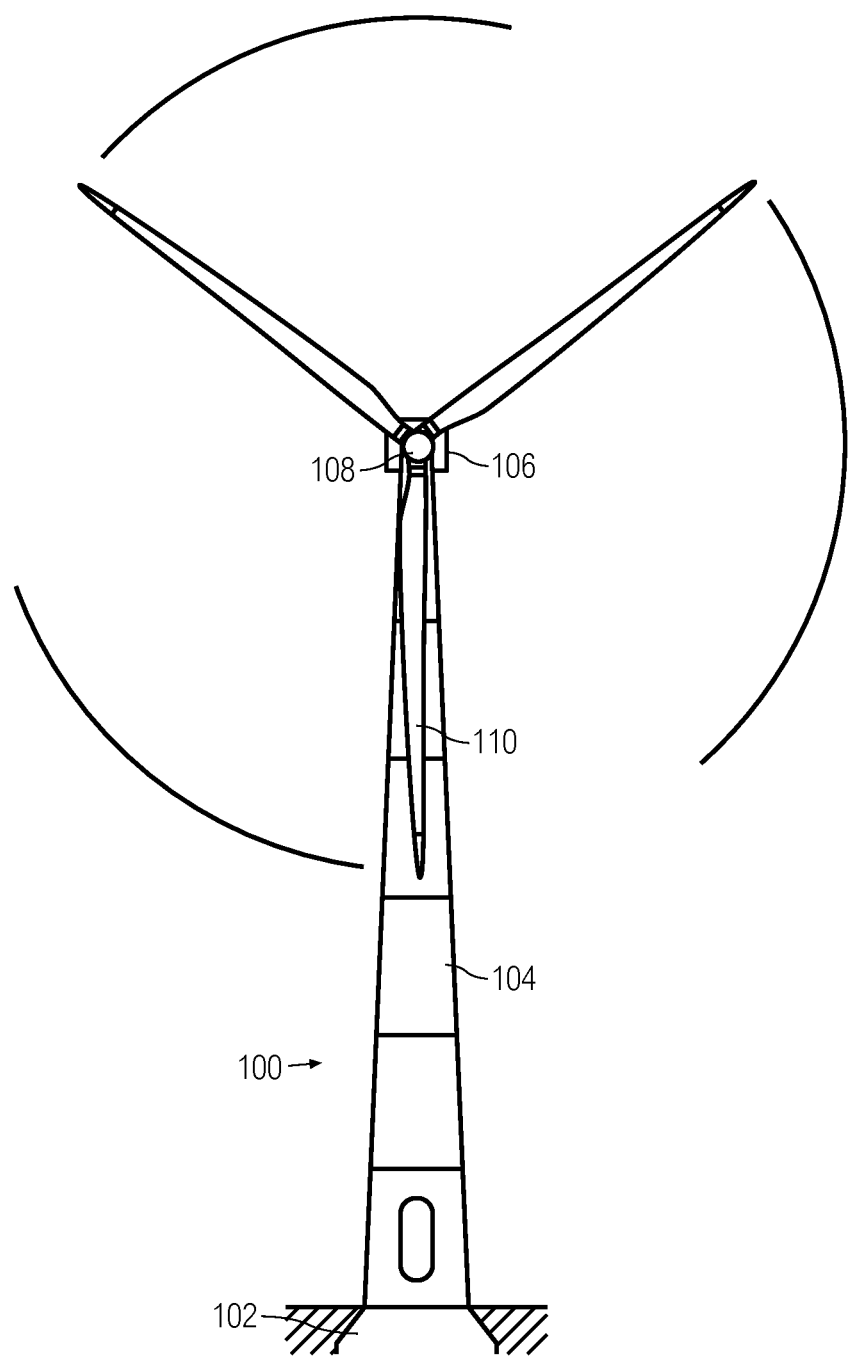
FIG. 1 illustrates a schematic drawing of a common setup of a conventional wind turbine.

FIG. 1 illustrates a common setup of a conventional wind turbine 100. The wind turbine 100 is mounted on a base 102. The wind turbine 100 includes a tower 104 having a number of tower sections, such as tower rings. A wind turbine nacelle 106 is placed on top of the tower 104. The wind turbine rotor includes a hub 108 and at least one rotor blade 110, e.g. three rotor blades 110. The rotor blades 110 are connected to the hub 108 which in turn is connected to the nacelle 106 through a low speed shaft which extends out of the front of the nacelle 106.

Figure 2:
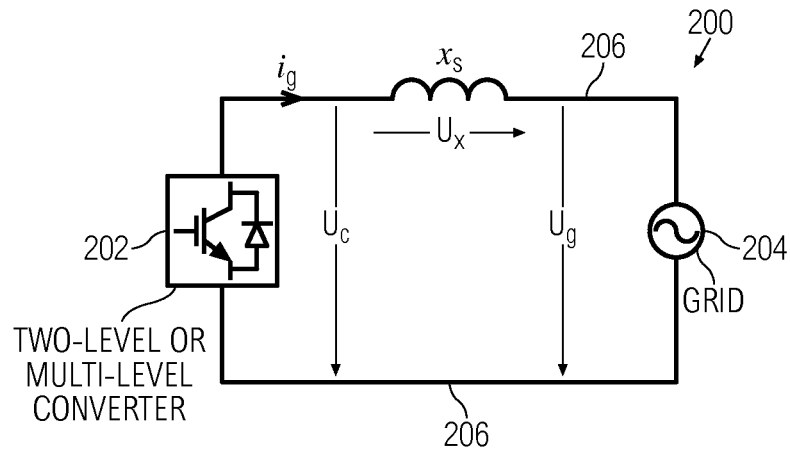
FIG. 2 shows a schematic drawing of an arrangement comprising a grid side converter, a grid transformer, and a power line connecting the grid side converter to the grid transformer as well as corresponding voltages and currents occurring in this arrangement.

FIG. 2 shows an arrangement 200 comprising a grid side converter 202, a low voltage side 204 of a grid transformer (not shown), and a power line 206 connecting the grid side converter 202 to the grid 204 as well as corresponding voltages and currents occurring in this arrangement. In FIG. 2, $u_g$ denotes the voltage occurring at the input or low voltage side 204 of the grid transformer (also referred to as "grid voltage"), $u_e$ denotes the voltage occurring at the output of the grid side converter 202 (also referred to as "converter voltage"), and $i_g$ denotes the line current flowing through the power line 206. $x_s$ denotes an reactance of the power line 206, and $u_x$ denotes the voltage drop over the reactance $x_s$. The major component of $x_s$ is the grid choke reactance.

In normal condition, it can be assumed that the grid voltage $u_g$ is constant. In general, for any grid condition $u_g$ can be considered as the grid reference voltage for the grid converter control. The voltage $u_x$ changes if the line current $i_g$ changes. The line current $i_g$ itself changes with respect to the demanded power which has to be supplied by the grid side converter 202 to the low voltage side 204 of the grid transformer. Thus, the voltage $u_e$ has to be adapted due to a change of the demanded power, $i_g$ and therefore $u_x$ changes.

In order to adapt the voltage $u_e$, the grid side converter 202 has to be controlled accordingly. In the following, methods/systems for controlling the grid side converter 202 are described which are capable of supporting the demanded power quality even during abnormal voltage conditions, and which are easy to realize.

Figure 7:
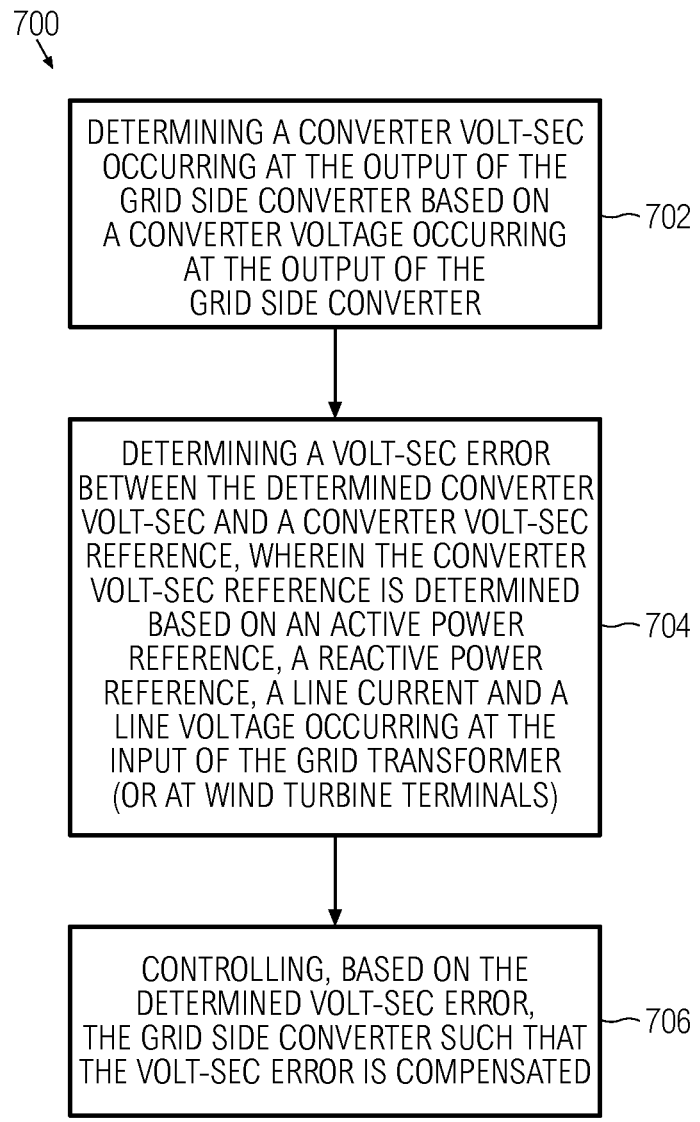
FIG. 7 shows a flowchart of a method of controlling a grid side converter of a wind turbine according to an embodiment of the present invention.

FIG. 7 shows an embodiment of a method 700 of controlling a grid side converter of a wind turbine. An output of the grid side converter is connected or connectable via a power line to an input of a grid transformer. At 702, a converter volt-sec occurring at the output of the grid side converter is determined based on a converter voltage occurring at the output of the grid side converter. At 704, a volt-sec error (i.e. a difference between the converter volt-sec and a converter volt-sec reference) is determined, wherein the converter volt-sec reference is determined based on an active power reference, a reactive power reference, a line current and a line voltage occurring at the input of the grid transformer (or at wind turbine terminals). At 706, based on the determined volt-sec error, the grid side converter is controlled such that the volt-sec error is compensated.

Figure 3:
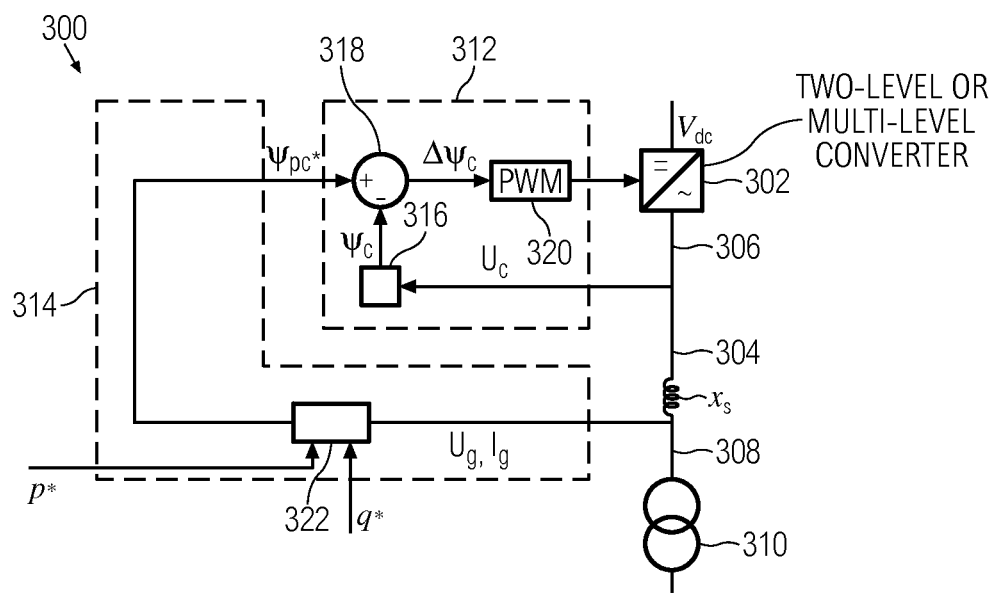
FIG. 3 shows a schematic drawing of a grid converter control system according to an embodiment of the present invention.

FIG. 3 shows a controlling system 300 according to an embodiment of the present invention which is an example of realizing the method as indicated in FIG. 7. The controlling system 300 controls a grid side converter 302 of a wind turbine. An output 306 of the grid side converter 302 is connected or is connectable via a power line 304 to an input 308 of a grid transformer 310. The controlling system 300 comprises an inner control loop arrangement 312 and an outer control loop arrangement 314. The inner control loop arrangement 312 comprises a converter volt-sec determining unit 316 which determines a converter volt-sec $\phi_c$ occurring at the output 306 of the grid side converter 302 based on a converter voltage $u_c$ occurring at the output 306 of the grid side converter 302. The inner control loop 312 further comprises a volt-sec error determining unit 318 determining a volt-sec error $\Delta\phi_c$ between the determined converter volt-sec $\phi_c$ and a converter volt-sec reference $\phi_{pc}*$, and a controlling unit 320 which controls, based on the determined volt-sec error $\Delta\phi_c$, the grid side converter 302 such that the volt-sec error $\Delta\phi_c$ is compensated. The outer control loop arrangement 314 comprises a unit 322 for determining the converter volt-sec reference $\phi_{pc}$* based on an active power reference p*, a reactive power reference q*, a line current $i_g$ and a line voltage $u_g$ occurring at the input 308 of the grid transformer 310.

The unit 322 for determining the converter volt-sec reference $\phi_{pc}$* may comprise several subunits, as will become apparent below in conjunction with FIG. 6 where a more detailed example of a realization of the embodiment as shown in FIG. 3 will be explained. It should also be noted that the outer control loop arrangement 314 may comprise not only one, but several feedback lines, as will become apparent below in conjunction with FIG. 6.

As can be derived from FIG. 3, the controlling system 300 is a volt-sec based control system. That is, the controlling system 300 controls the power output by the grid side converter 302 not based on direct voltage control or direct current control, but on volt-sec control. This means that not the voltage or current output by the grid side converter 302 is controlled, but the volt-sec (also referred to as "volt seconds" ("volt-sec")) output by the grid side converter 302 is controlled.

Figure 4A:
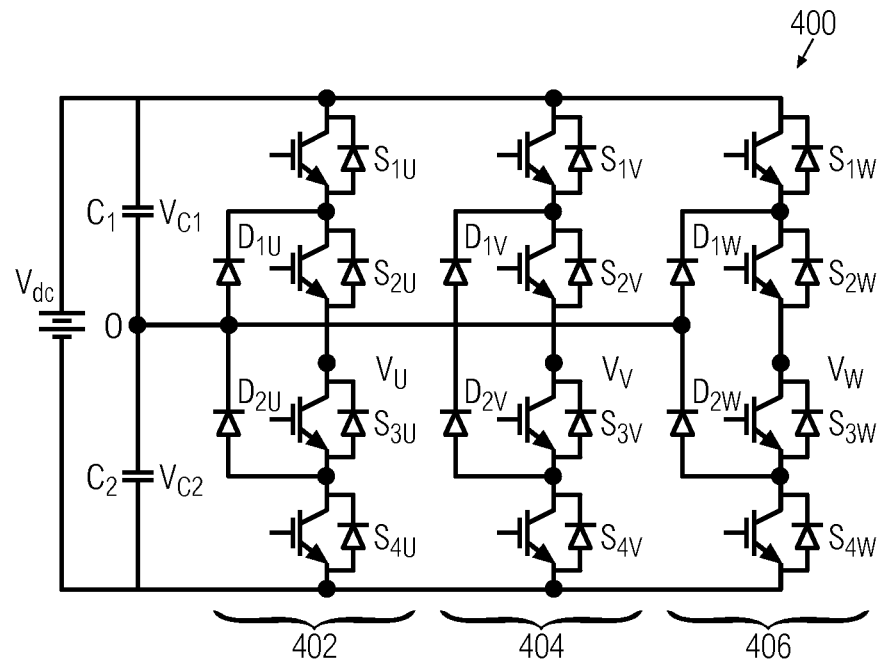
FIGS. 4A and 4B show schematic drawings of examples of grid side converters which may be used within a control system according to an embodiment of the present invention.
Figure 4B:
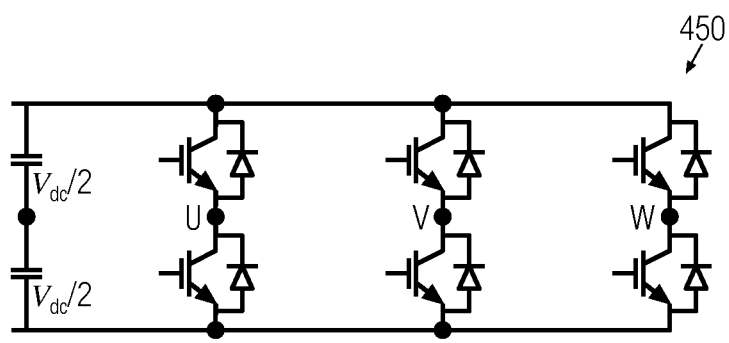
Figure 5:
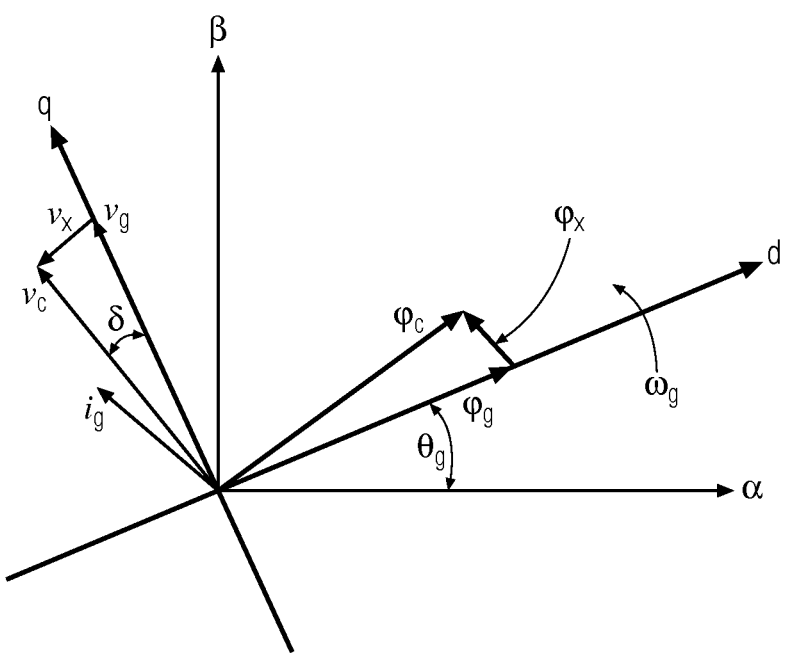
FIG. 5 shows the relationship between voltages, currents and volt-secs occurring in the control system shown in FIG. 6.

FIG. 4A shows an example 400 of a grid side converter 302 which may be employed in embodiments of the present invention. In this embodiment, the grid side converter 400 is a three-level converter which has three legs i.e. 402, 404, and 406 (since it is assumed that a three phase power generating system is used). The present invention is not restricted to the grid side converter 400; instead converters having two-levels or more than three-levels may be used, depending on the power generating system used. For example, FIG. 4B shows a two-level converter.

Figure 6:
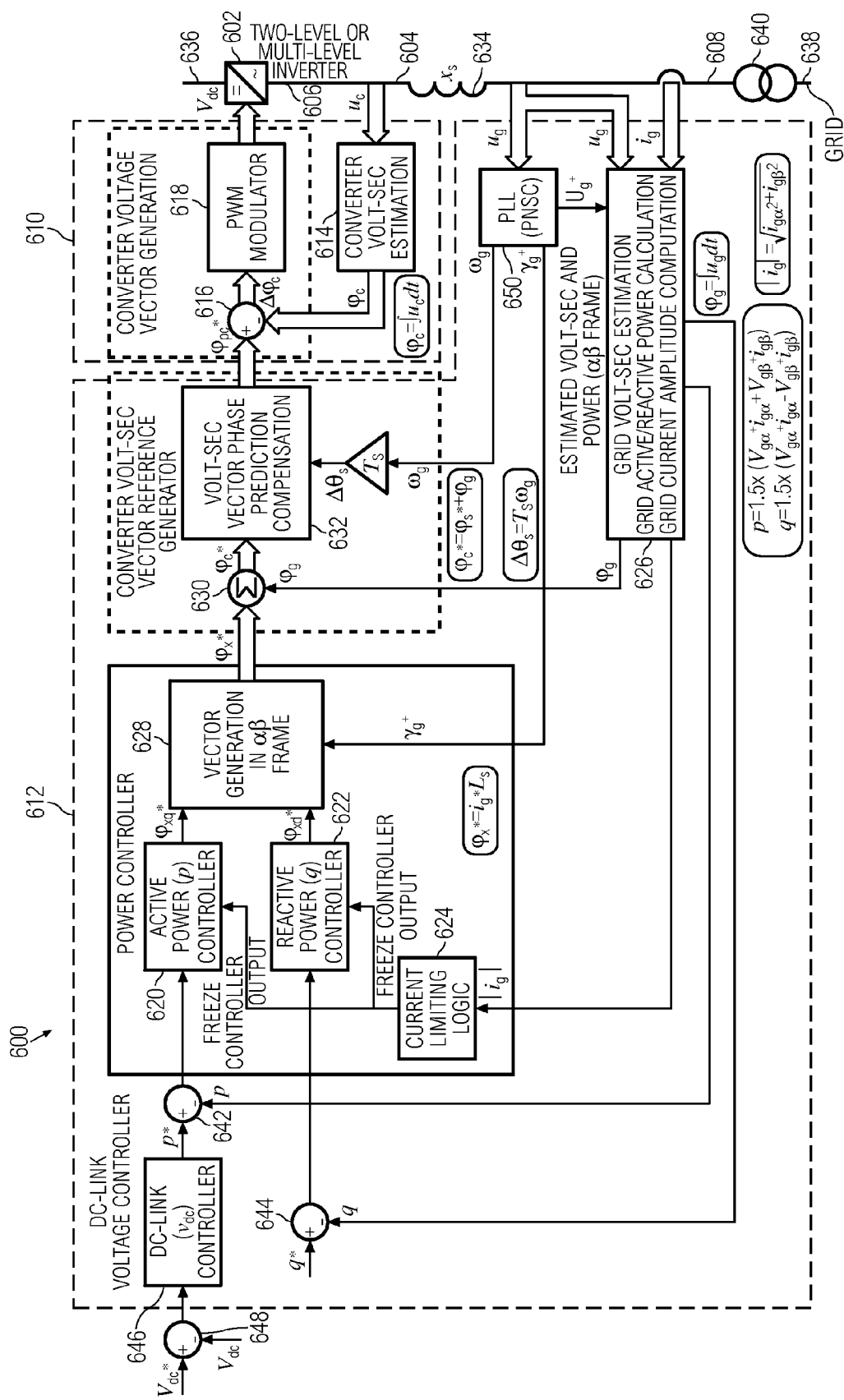
FIG. 6 shows a schematic drawing of an example of a control system according to an embodiment of the present invention.

FIG. 6 shows a controlling system 600 for controlling a grid side converter 602 of a wind turbine 100. An output 606 of the grid side converter 602 is connected or connectable via a power line 604 (which includes a grid choke 634) to an input 608 of a grid transformer 640. The grid side converter 602 is connected via a DC-link (not shown) to an AC power generator (not shown) through a generator side converter. A DC link voltage 636 is measured across the DC-link connected to the grid side converter 602. An output 638 of the grid transformer 640 (which may be an output of the wind turbine nacelle) is connected to a power grid (not shown).

The controlling system 600 comprises an inner control loop arrangement 610 and an outer control loop arrangement 612. The inner control loop arrangement 610 comprises: a converter volt-sec determining unit 614 which determines a converter volt-sec $\phi_e$ occurring at the output 606 of the grid side converter 602 based on a converter voltage $u_c$ occurring at the output 606 of the grid side converter 602. The converter volt-sec $\phi_c$ may for example be determined using the following formula:

$$\phi_c = \int u_c dt$$

That is, the converter volt-sec $\phi_c$ may be obtained by integrating the measured converter voltage $u_c$ occurring at the output 606 of the grid side converter 602 over the time. The converter volt-sec $\phi_c$ may also be estimated through converter duty ratios and the DC-link voltage. The converter volt-sec $\phi_c$ may also be calculated with different approaches.

The inner control loop arrangement 610 further comprises a volt-sec error determining unit 616 determining a volt-sec error $\Delta\phi_c$ (i.e. a difference between the converter volt-sec $\phi_c$ and a converter volt-sec reference $\phi_{pc}$* ($\phi_{pc}$* is the target volt-sec to be output by the grid side converter 602)). The volt-sec difference $\Delta\phi_c$ is also referred to as "volt-sec error". Part of the inner control loop arrangement 610 is also a controlling unit 618 which controls, based on the determined volt-sec error $\Delta\phi_c$, the grid side converter 602 such that the volt-sec error $\Delta\phi_c$ is compensated. The controlling unit 618 is essentially a PWM unit which determines the duty ratios for the power switches of the grid side converter 602.

The outer control loop arrangement 612 comprises several units for determining the converter volt-sec reference $\phi_{pc}$* based on active power reference p*, reactive power reference q*, line current $i_g$ and a line voltage $u_g$ occurring at the input 608 of the grid transformer 640. These units will be described in the following.

The outer control loop arrangement 612 comprises an active power volt-sec reference determining unit 620 and a reactive power volt-sec reference determining unit 622 which determine an active power volt-sec reference $\phi_{xq}$*(projection of the volt-sec $\phi_x$* on the q-axis) and a reactive power volt-sec reference $\phi_{xd}$* (projection of the volt-sec $\phi_x$* on the d-axis) based on an active power reference p* and a reactive power reference q* demanded at the input 608 of the grid transformer 640 (or at wind turbine terminals), respectively.

The active power volt-sec reference determining unit 620 determines the active power volt-sec reference $\phi_{xq}$* based on a difference between an active power reference p* and an active power p occurring at the input 608 of the grid transformer 640 (or at wind turbine terminals). The difference between an active power reference p* and an active power p is calculated by an active power difference calculating unit 642. The active power reference p* is generated by a DC link voltage controller unit 646 and supplied to the active power difference calculating unit 642. The DC link voltage controller unit 646 is itself driven by a difference between a DC link voltage reference $V_{dc}$* and the DC link voltage $V_{dc}$ determined by a DC voltage difference calculating unit 648. The DC-link controller can be implemented in many different ways but the output of the controller is p*. The active power reference p* can be reduced under certain conditions e.g. grid support. This can be done through a modification block (not shown).

The reactive power volt-sec reference determining unit 622 determines reactive power volt-sec reference $\phi_{xd}$* based on a difference between a reactive power reference q* and a reactive power q occurring at the input 608 of the grid transformer 640 (or at wind turbine terminals). The difference between a reactive power reference q* and a reactive power q is calculated by a reactive power difference calculating unit 644. The reactive power reference q* is mainly determined based on grid support requirements.

The outer control loop arrangement 612 comprises a current limiting unit 624 which causes the active power volt-sec reference $\phi_{xq}$* and the reactive power volt-sec reference $\phi_{xd}$* to be respectively frozen if the amplitude of the line current $i_g$ occurring at the input 608 of the grid transformer 640 exceeds a predetermined threshold value.

The outer control loop arrangement 612 further comprises a unit 626 comprising an active power determining subunit and a reactive power determining subunit which determine the active power p and reactive power q based on the line current $i_g$ and the line voltage $u_g$ occurring at the input 608 of the grid transformer 640, respectively. The unit 626 further comprises an amplitude determining subunit which determines the amplitude of the line current $i_g$ which is supplied to the current limiting unit 624.

The amplitude of the line current $i_g$ may for example be calculated based on the following equation:

$$|i_g| = \sqrt{i_{g\alpha}^2 + i_{g\beta}^2},$$

wherein $i_{g\alpha}$ is the α-component of the line current, and $i_{g\beta}$ is the β-component of the line current. However, the line current $i_g$ may also be calculated in a different manner.

The active power p may for example be calculated based on the following equation:

$$p=1.5*(v_{g\alpha}{}^+i_{g\alpha}{}^++v_{g\beta}{}^+i_{g\beta}{}^+),$$

wherein $v_{g\alpha}{}^+$ is the positive sequence α-component of the line voltage $u_g$, $v_{g\beta}{}^+$ is the positive sequence β-component of the line voltage $u_g$, $i_{g\alpha}{}^+$ is the positive sequence α-component of the line current $i_g$, and $v_{g\beta}{}^+$ is the positive sequence β-component of the line current $i_g$. In general '+' indicates the positive sequence component of the respective currents/voltages. The active power p may also be calculated in a different manner.

The reactive power q may for example be calculated based on the following equation:

$$q=1.5*(v_{g\alpha}{}^+i_{g\beta}{}^+-v_{g\beta}{}^+i_{g\alpha}{}^+),$$

wherein $v_{g\alpha}{}^+$ is the positive sequence α-component of the line voltage $u_g$, $v_{g\beta}{}^+$ is the positive sequence β-component of the line voltage $u_g$, $i_{g\alpha}{}^+$ is the positive sequence α-component of the line current $i_g$, and $v_{g\beta}{}^+$ is the positive sequence β-component of the line current $i_g$. The reactive power q may also be calculated in a different manner.

In the above equations, it is shown above that only positive sequence voltages and currents are used to calculate active and reactive power. However, the embodiments of the present invention are not restricted thereto: it is also possible to use the negative sequence voltage and current to calculate the active and reactive power. Hence, either positive sequence or negative sequence or the combination can be used to calculate the active and reactive power.

The outer control loop arrangement 612 further comprises an αβ frame volt-sec vector generating unit 628 which generates a first volt-sec reference $\phi_x{}^*$ as an αβ frame volt-sec reference vector in dependence on the active power volt-sec reference $\phi_{xq}{}^*$ and the reactive power volt-sec reference $\phi_{xd}{}^*$.

The outer control loop arrangement 612 comprises a second volt-sec reference generating unit 630 which generates a second volt-sec reference $\phi_c{}^*$ by adding a grid volt-sec $\phi_g$ to the first volt-sec reference $\phi_x{}^*$. The unit 626 further comprises a grid volt-sec determining subunit which determines the grid volt-sec $\phi_g$ based on at least one of the line current $i_g$ and the line voltage $u_g$ occurring at the input 608 of the grid transformer 640.

The grid volt-sec is for example determined based on the following equation:

$$\phi_g\beta\int u_g dt$$

That is, the grid volt-sec $\phi_g$ may be obtained by integrating the measured converter voltage $u_g$ occurring at the input 608 of the grid transformer 640 over the time. However, the grid volt-sec $\phi_g$ may also be calculated in a different manner.

The outer control loop arrangement 612 comprises a converter volt-sec reference predicting unit 632 which predicts a next sampling cycle converter volt-sec $\phi_{pc}{}^*$ based on the second volt-sec reference $\phi_c{}^*$ and an angle difference $\Delta\theta_s$. $\Delta\theta_s$ is calculated based on an angular velocity $\omega_g$ of the line voltage $u_g$ occurring at the input 608 of the grid transformer 640 according to the equation $\Delta\theta_s=\omega_g*T_s$, wherein $T_s$ is the sampling period/cycle of the grid side converter 602. The volt-sec reference predicting unit 632 outputs the predicted converter volt-sec $\phi_{pc}{}^*$ as converter volt-sec reference. The angular velocity $\omega_g$ of the line voltage $u_g$ is determined by a PLL (Phase Locked Loop) unit 650.

The PLL unit 650 also determines, based on the line voltage $u_g$ occurring at the input 608 of the grid transformer 640, a grid angle $\gamma_g{}^+$ which is the angle of the positive sequence voltage. The grid angle $\gamma_g{}^+$ is used to transform the volt-sec reference from the dq frame representation (the active power volt-sec reference $\phi_{xq}{}^*$ and the reactive power volt-sec reference $\phi_{xd}{}^*$) into the αβ frame representation. If the power control with negative sequence is desired as well, a grid angle $\gamma_g{}^-$ which is the angle of the negative sequence voltage can also be easily calculated and used to transform the negative sequence volt-sec reference from the dq frame representation (the respective negative sequence active power volt-sec reference $\phi_{xq}{}^*$ and the reactive power volt-sec reference $\phi_{xd}{}^*$) into the αβ frame representation.

Use of the volt-sec reference predicting unit 632 leads to more accurate grid side converter response especially when the switching frequency is low; it also helps to obtain better dynamic response. However, it should be noted that the volt-sec reference predicting unit 632 is not absolutely necessary but its presence improve the performance.

Figure 8:
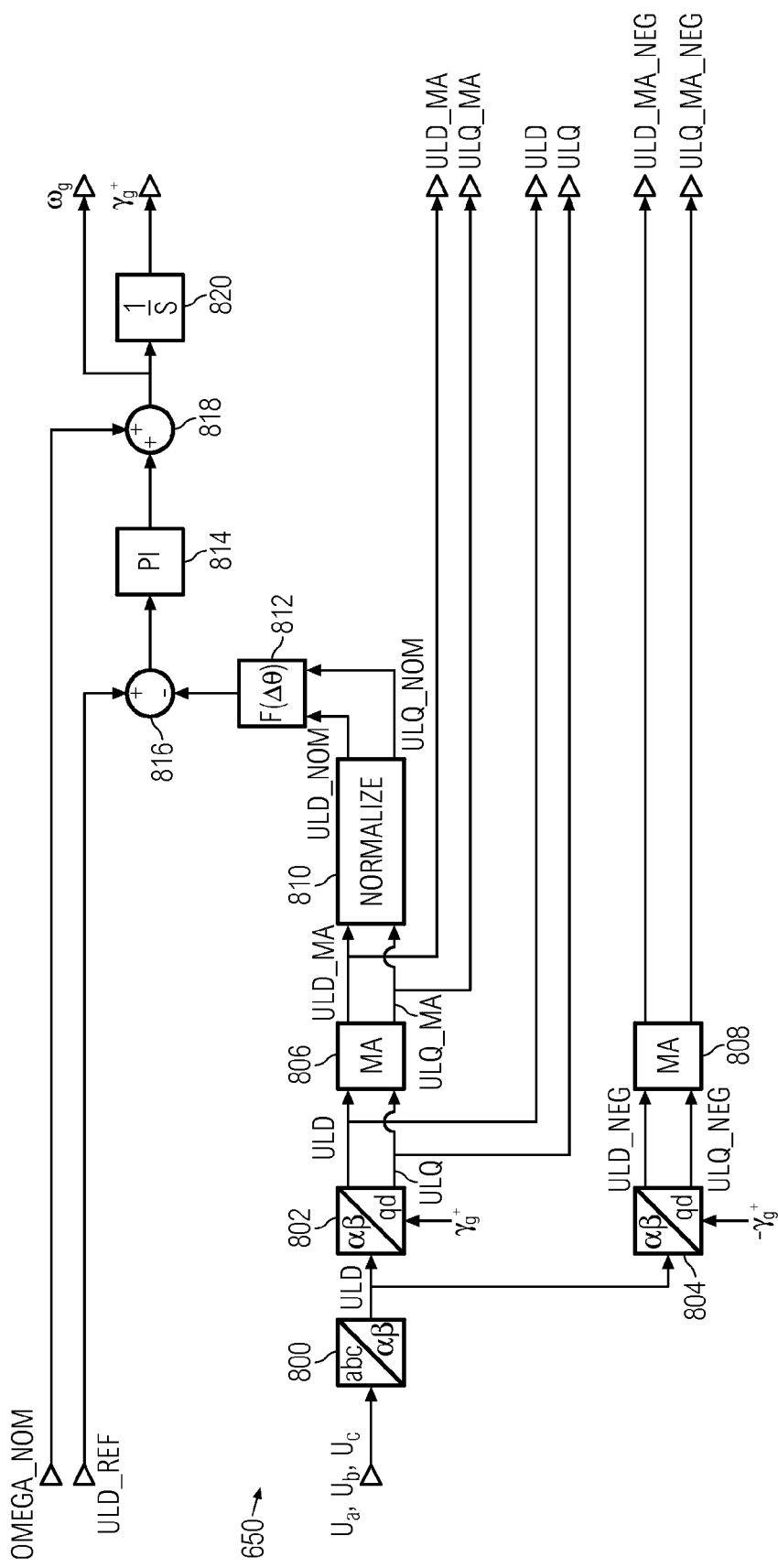
FIG. 8 shows a schematic drawing of a PLL algorithm usable within the control system shown in FIG. 6 according to an embodiment of the present invention.

In the following description, making reference to FIGS. 8 and 9, a possible embodiment of the PLL unit 650 will be described. It is to be understood that also other types of PLL (PNSC) algorithms may be used.

The PLL unit 650 receives three phase voltages $U_a$, $U_b$, $U_c$ extracted from the line voltage $u_g$ occurring at the input 608 of the grid transformer 640. The three phase voltages $U_a$, $U_b$, $U_c$ are transformed into the αβ frame in order to obtain an α-axis component $U_\alpha$ of the line voltage $u_g$, and a β-axis component $U_\beta$ of the line voltage $u_g$ using an abc/αβ transforming unit 800.

A first αβ/qd transforming unit 802 transforms the line voltage components $U_\alpha$ and $U_\beta$ into the dq frame using the voltage vector phase angle $\gamma_g{}^+$, e.g. in accordance with $$\begin{bmatrix} ULQ \\ ULD \end{bmatrix} = \begin{bmatrix} \cos\gamma_g^+ & \sin\gamma_g^+ \\ \sin\gamma_g^+ & -\cos\gamma_g^+ \end{bmatrix} \cdot \begin{bmatrix} U\alpha \\ U\beta \end{bmatrix}$$

wherein ULD is the d-axis component of the positive sequence line voltage in the d/q frame, and ULQ is the q-axis component of the positive sequence line voltage in the d/q frame.

Further, a second αβ/qd transforming block 804 transforms the line voltage components $U_\alpha$ and $U_\beta$ into the dq frame using the negative voltage vector phase angle $-\gamma_g{}^+$, e.g. in accordance with $$\begin{bmatrix} ULQ\_NEG \\ ULD\_NEG \end{bmatrix} = \begin{bmatrix} \cos(-\gamma_g^+) & \sin(-\gamma_g^+) \\ \sin(-\gamma_g^+) & -\cos(-\gamma_g^+) \end{bmatrix} \cdot \begin{bmatrix} U\alpha \\ U\beta \end{bmatrix}.$$

where ULD_NEG is the d-axis component of the negative sequence line voltage in the d/q frame, and ULQ_NEG is the q-axis component of the negative sequence line voltage in the d/q frame.

The line voltage components ULD, ULQ are fed into a first half cycle moving average function unit 806, and the line voltage components ULD_NEG, ULQ_NEG are fed into a second half cycle moving average function unit 808. The half cycle moving average function units 806, 808 respectively process the input signals ULD, ULQ/ULD_NEG, ULQ_NEG according to the following equation $$y = f(x) = \frac{1}{T} \int_{t-T}^{t} x(t) * dt,$$

wherein y is the moving average of the respective input signal, x(t) is the input signal, T is the time of a sampling cycle, and t is the integration parameter (time). The half cycle moving average function unit 806 serves for cancelling negative sequence effects and harmonics effects.

In order to implement the half cycle moving average function units 806, 808, a buffer may respectively be used which holds data of a half cycle, wherein the output of the half cycle moving average function units 806, 808 is the average of the half cycle data stored within the buffer. The signal ULD_MA output by the half cycle moving average function unit 806 represents the d-axis component of the positive sequence line voltage of a half cycle moving average. The signal ULQ_MA output by the half cycle moving average function unit 806 represents the q-axis component of the positive sequence line voltage of a half cycle moving average. The signal ULD_MA_NEG output by the half cycle moving average function unit 808 represents the d-axis component of the negative sequence line voltage of a half cycle moving average. The signal ULQ_MA_NEG output by the half cycle moving average function unit 808 represents the q-axis component of the negative sequence line voltage of a half cycle moving average.

A normalization block 810 normalizes the signals ULD_MA and ULQ_MA. in accordance to $$ULD\_NOM = ULD\_MA / \sqrt{(ULD\_MA^2 + ULQ\_MA^2)},$$

$$ULQ\_NOM = ULQ\_MA / \sqrt{(ULD\_MA^2 + ULQ\_MA^2)}$$

in order to generate the normalized output signals ULD_NOM and ULQ_NOM. The normalization process may be used to eliminate the influence of the voltage amplitude on the phase lock loop control. Thus, the PLL unit 650 has the same performance for different line voltages $u_g$ on different platforms.

The normalized output signals ULD_NOM and ULQ_NOM are fed into a mapping unit 812 which maps these signals to a function value of a function F which may be seen as function of the phase error $\Delta\theta$ between the actual voltage phase angle (i.e. the phase angle of the current line voltage as represented by ULD_NOM and ULQ_NOM) and the estimated voltage vector phase angle (i.e. the fed back estimate for the line voltage phase angle $\gamma_g^+$) according to $$F(\Delta\theta) = \tan(\Delta\theta), -\Delta\theta 1 < \Delta\theta < \Delta\theta 1$$

$$F(\Delta\theta) = \tan(\Delta\theta 1) = \omega_{Lim}, \Delta\theta 1 < \Delta\theta < \pi$$

$$F(\Delta\theta) = \tan(-\Delta\theta 1) = -\omega_{Lim}, -\pi < \Delta\theta < -\Delta\theta 1$$

where $\Delta\theta 1$ is a pre-defined threshold value. The phase error $\Delta\theta$ is for example determined according to $\tan(\Delta\theta) = ULD\_NOM/ULQ\_NOM$.

Figure 9:
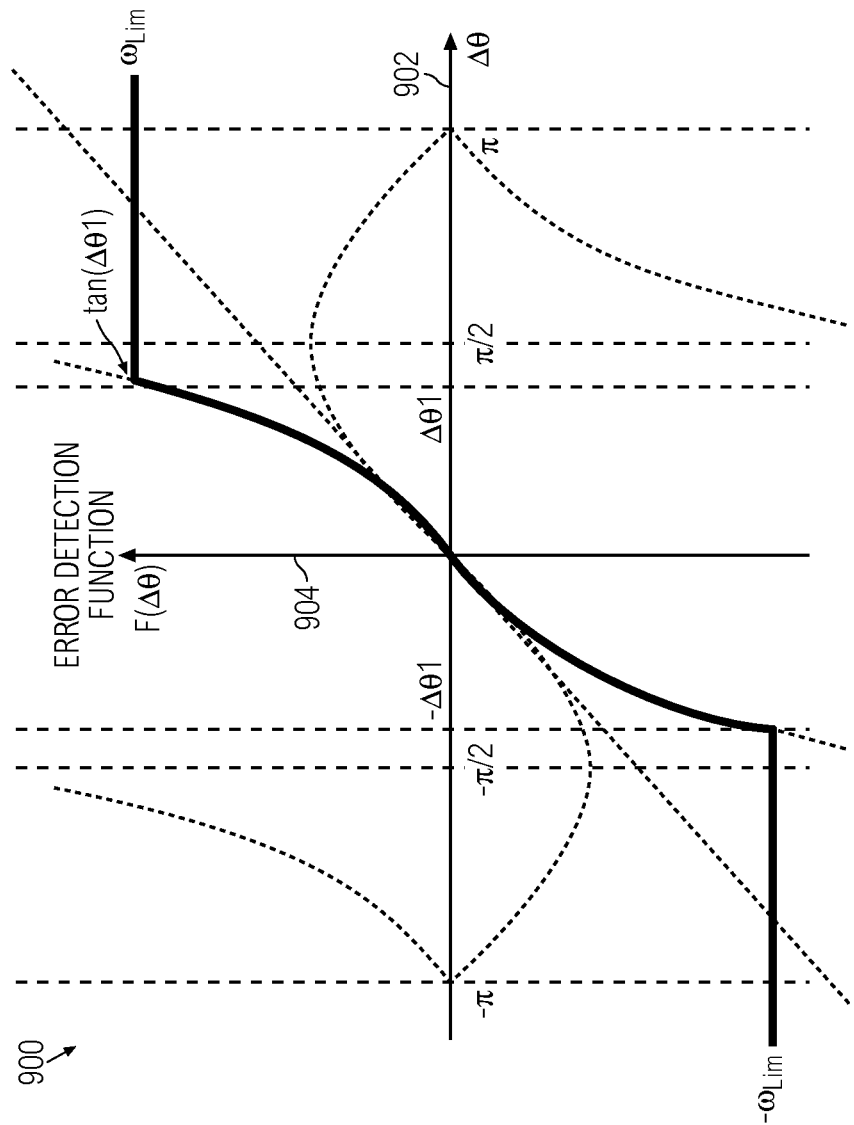
FIG. 9 shows a schematic drawing of an error detection function usable within the PLL algorithm shown in FIG. 8 according to an embodiment of the present invention.

The function F is illustrated in FIG. 9. FIG. 9 shows a graph indicating the output of a function F(d,q) versus the phase error according to one embodiment. A first axis 902 (x-axis) of the graph 900 corresponds to the possible values of the phase error $\Delta\theta$, and a second axis 904 (y-axis) of the graph 900 corresponds to the function values of F. It can be seen from the graph 900 that the output of this mapping unit 812 is following a tangent function when the angle difference is less than $\Delta\theta 1$; and when the angle difference is larger than $\Delta\theta 1$, the output is clamped at the max value of $\omega_{Lim}$. This mechanism will adjust the tuning velocity depending on the angle difference, and when the angle difference is large, it will yield a faster tuning speed.

The output of the mapping unit 812 is compared to a reference value ULD_REF (d-axis reference value; it is normally zero if the voltage sensor delay is not considered) by a comparing unit 816, and a corresponding comparison result is fed into a PI controller unit 814.

An adding unit 818 adds to the output of the PI controller unit 814 the nominal voltage frequency (50/60 Hz) in order to obtain the estimated angular speed $\omega_g$ of the voltage vector in the dq frame. The PI controller unit 814 changes (by acceleration or deceleration) the estimated angular speed $\omega_g$ such that, in dependence on the phase error $\Delta\theta$, the estimated phase angle $\gamma_g^+$ (in the dq frame) meets up with the voltage vector angle.

An integrating unit 820 generates an estimated phase angle $\gamma_g^+$ of the voltage vector by integration of the angular speed $\omega_g$ in the dq frame.

In the above description of the PLL unit 650, the positive sequence voltage has been used in order to determine the estimated phase angle $\gamma_g^+$ and the angular speed $\omega_g$. That is, the signals ULD_NOM and ULQ_NOM have been used to determine $\gamma_g^+$ and $\omega_g$. However, it should be mentioned that, in order to determine $\gamma_g^+$ and $\omega_g$, also the signals ULD_MA_NEG and ULQ_MA_NEG could be used. In other words, the estimated phase angle $\gamma_g^+$ and the angular speed $\omega_g$ can also be determined using negative sequence voltages.

In other words, according to an embodiment of the present invention, the working principle of the embodiment of FIG. 6 may be summarized as follows: FIG. 6 shows an implementation of a grid converter direct power control scheme using a volt-sec compensation based method. A DC-link voltage controller 646 generates an active power reference p*. The active power reference p* may be modified during grid/system faults. A reactive power reference q* is set according to a reactive power demand. An active power feedback control is used to generate a q-axis volt-sec reference $\phi_{xq}^*$, whereas a reactive power feedback control is used to generate a d-axis volt-sec reference $\phi_{xd}^*$. The vector sum of $\phi_{xq}^*$ and $\phi_{xd}^*$ and subsequent dq→αβ transformation provides a total volt-sec $\phi_x^*$ associated with a grid choke 634. A line current limiting is realized by freezing reactive and active power controller outputs when a measured line current $i_g$ hits a maximum current. A simple PLL 650 is used to estimate grid angle, angular speed of the grid voltage and the grid voltage. The PLL 650 may be implemented in synchronous rotating frame (SRF) and may use moving average (MA) to eliminate negative sequence and harmonics components from the grid voltage $u_g$. Grid voltage angular frequency omega $\omega_g$ and grid voltage angle gamma $\gamma_g^+$ are calculated based on a positive sequence of voltages. However, use of negative sequence voltage is also possible. A reference volt-sec vector $\phi_c^*$ for the converter is the sum of grid volt-sec vector $\phi_g$ and volt-sec vector $\phi_x^*$ associated with the grid choke. Subsequently volt-sec prediction is used to implement a deadbeat controller. The converter volt-sec error vector $\Delta\phi_c$ is utilized to generate a converter voltage reference vector. Using $\Delta\phi_e$, the final PWM signals are produced for the grid side converter 602.

While embodiments of the invention have been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method of controlling a grid side converter of a wind turbine, wherein an output of the grid side converter is connected or connectable via a power line to an input of a grid transformer, comprising:
   computing a converter volt-sec occurring at the output of the grid side converter based on a converter voltage occurring at the output of the grid side converter;
   determining a volt-sec error between the determined converter volt-sec and a converter volt-sec reference, wherein the converter volt-sec reference is determined based on an active power reference, a reactive power reference, a line current and a line voltage occurring at the input of the grid transformer; and
   controlling, based on the determined volt-sec error, the grid side converter such that the volt-sec error is partially or fully compensated.

2. The method according to claim 1,
   wherein the converter volt-sec reference is determined based on an active power volt-sec reference and a reactive power volt-sec reference.

3. The method according to claim 2,
   wherein the active power volt-sec reference is determined based on a difference between an active power reference demanded at the input of the grid transformer and an active power occurring at the input of the grid transformer.

4. The method according to claim 2,
   wherein the reactive power volt-sec reference is determined based on a difference between a reactive power reference demanded at the input of the grid transformer and a reactive power occurring at the input of the grid transformer.

5. The method according to claim 2,
   wherein the active power volt-sec reference and the reactive power volt-sec reference are respectively frozen if the amplitude of the line current occurring at the input of the grid transformer exceeds a predetermined threshold value.

6. The method according to claim 3,
   wherein the active power and the reactive power are determined based on the line current and the line voltage occurring at the input of the grid transformer.

7. The method according to claim 2,
   wherein determining the converter volt-sec reference comprises generating a first volt-sec reference in a dq frame in dependence on the active power volt-sec reference and the reactive power volt-sec reference.

8. The method according to claim 7,
   wherein the first volt-sec reference is generated as an αβ frame volt-sec vector.

9. The method according to claim 7,
   wherein determining the converter volt-sec reference comprises generating a second volt-sec reference by adding a grid volt-sec to the first volt-sec reference.

10. The method according to claim 9,
    wherein the grid volt-sec is determined based on at least one of the line current and the line voltage occurring at the input of the grid transformer.

11. The method according to claim 9,
    wherein determining the converter volt-sec reference comprises predicting a next sampling cycle converter volt-sec based on the second volt-sec reference, an angular velocity of the line voltage occurring at the input of the grid transformer and a sampling period of the grid side converter, and using the predicted converter volt-sec as converter volt-sec reference.

12. The method according to claim 1,
    wherein the controlling of the grid side converter is carried out by supplying, in dependence on the determined volt-sec error, pulse width modulation signals to the grid side converter which adjust the output voltage of the grid side converter accordingly.

13. The method according to claim 1,
    wherein the compensation of the volt-sec error is carried out by using a PWM switching technique in the linear region of grid side converter operation, and by using an over-modulation technique in the non-linear region of the grid side converter operation.

14. The method according to claim 1,
    wherein positive sequence voltages and currents are used to calculate the active power and the reactive power, or wherein negative sequence voltages and currents are used to calculate the active power and the reactive power, or wherein a combination of positive sequence voltages and currents and negative sequence voltages and currents are used to calculate the active power and the reactive power.

15. The method according to claim 1,
    wherein, depending on regulation and system requirements, controlling the active power to the active power reference is given priority over controlling the reactive power to the reactive power reference, or vice versa.

16. A controlling system for controlling a grid side converter of a wind turbine comprising:
    an inner control loop and an outer control loop;
    wherein the inner control loop comprises:
    a converter volt-sec determining unit which determines a converter volt-sec occurring at an output of a grid side converter based on a converter voltage occurring at the output of the grid side converter, wherein the output of the grid side converter is connectable via a power line to an input of a grid transformer;
    a volt-sec error determining unit determining a volt-sec error between the determined converter volt-sec and a converter volt-sec reference; and
    a controlling unit which controls, based on the determined volt-sec error, the grid side converter such that the volt-sec error is partially or fully compensated; and
    wherein the outer control loop is configured to determine the converter volt-sec reference based on an active power reference, a reactive power reference, a line current and a line voltage occurring at the input of the grid transformer.

17. The controlling system according to claim 16,
    wherein the outer control loop comprises an active power volt-sec reference determining unit and a reactive power volt-sec reference determining unit which determines an active power volt-sec reference and a reactive power volt-sec reference in a dq frame based on an active power reference and a reactive power reference requested at the input of the grid transformer.

18. The controlling system according to claim 17,
    wherein the active power volt-sec reference determining unit determines the active power volt-sec reference based on a difference between an active power reference and an active power occurring at the input of the grid transformer.

19. The controlling system according to claim 17,
    wherein the reactive power volt-sec reference determining unit determines reactive power volt-sec reference based on a difference between a reactive power reference and a reactive power occurring at the input of the grid transformer.

20. The controlling system according to claim 17, wherein the outer control loop comprises a current limiting unit which causes the active power volt-sec reference and the reactive power volt-sec reference to be respectively frozen if the amplitude of the line current occurring at the input of the grid transformer exceeds a predetermined threshold value.

21. The controlling system according to claim 16, wherein the outer control loop comprises an active power determining unit and a reactive power determining unit which determine the active power and reactive power based on the line current and the line voltage occurring at the input of the grid transformer, respectively.

22. The controlling system according to claim 17, wherein the outer control loop comprises an αβ frame volt-sec vector generating unit which generates a first volt-sec reference as an αβ frame volt-sec vector in dependence on the active power volt-sec reference, the reactive power volt-sec reference and an angle of the line voltage.

23. The controlling system according to claim 22, wherein the outer control loop comprises a second volt-sec reference generating unit which generates a second volt-sec reference by adding a grid volt-sec to the first volt-sec reference.

24. The controlling system according to claim 16, wherein the outer control loop comprises a grid volt-sec determining unit which determines the grid volt-sec based on at least one of the line current and the line voltage occurring at the input of the grid transformer.

25. The controlling system according to claim 23, wherein the outer control loop comprises a converter volt-sec reference predicting unit which predicts next sampling cycle converter volt-sec based on the second volt-sec reference, an angular velocity of the line voltage occurring at the input of the grid transformer and a sampling period of the grid side converter, and outputs the predicted converter volt-sec as converter volt-sec reference.

26. The controlling system according to claim 16, wherein the inner control loop comprises a PWM unit which controls, in dependence on the determined volt-sec error, the output voltage of the grid side converter by supplying pulse width modulation signals to the grid side converter.

27. A wind turbine, comprising:
a power generator;
a grid side converter, wherein the power generator is connected to the grid side converter via a generator side converter and a DC-link connecting the generator side converter with the grid side converter; and
a controlling system, wherein an output of the grid side converter is connected or connectable via a power line to an input of a grid transformer, wherein the controlling system comprises an inner control loop and an outer control loop;
wherein the inner control loop comprises:
a converter volt-sec determining unit which determines a converter volt-sec occurring at the output of the grid side converter based on a converter voltage occurring at the output of the grid side converter;
a volt-sec error determining unit determining a volt-sec error between the determined converter volt-sec and a converter volt-sec reference; and
a controlling unit which controls, based on the determined volt-sec error, the grid side converter such that the volt-sec error is partially or fully compensated; and
wherein the outer control loop is configured to determine the converter volt-sec reference based on an active power reference, a reactive power reference, a line current and a line voltage occurring at the input of the grid transformer.

* * * * *